US012686305B2

(12) United States Patent
Helin

(10) Patent No.: US 12,686,305 B2
(45) Date of Patent: Jul. 21, 2026

(54) ISOLATOR AND SUSPENSION ASSEMBLY FOR RIDING EQUIPMENT

(71) Applicant: MTD PRODUCTS INC, Valley City, OH (US)

(72) Inventor: Philip Helin, Peninsula, OH (US)

(73) Assignee: MTD PRODUCTS INC, Valley City, OH (US)

(\*) Notice: Subject to any disclaimer, the term of this patent is extended or adjusted under 35 U.S.C. 154(b) by 513 days.

(21) Appl. No.: 17/901,919

(22) Filed: Sep. 2, 2022

(65) Prior Publication Data

US 2022/0410772 A1 Dec. 29, 2022

Related U.S. Application Data

(62) Division of application No. 16/571,756, filed on Sep. 16, 2019, now Pat. No. 11,433,788.

(51) Int. Cl.
| | |
|---|---|
| *B60N 2/50* | (2006.01) |
| *F16F 15/04* | (2006.01) |
| *B60N 2/015* | (2006.01) |
| *B60N 2/10* | (2006.01) |
| *B60N 2/38* | (2006.01) |

(52) U.S. Cl.
CPC .............. *B60N 2/502* (2013.01); *F16F 15/04* (2013.01); *B60N 2/015* (2013.01); *B60N 2/10* (2013.01); *B60N 2/38* (2013.01)

(58) Field of Classification Search
CPC ...................................................... F16F 1/025
See application file for complete search history.

(56) References Cited

U.S. PATENT DOCUMENTS

| | | | |
|---|---|---|---|
| 1,017,356 A | 2/1912 | Whiting | |
| 4,215,841 A | 8/1980 | Herring, Jr. | |
| 4,311,204 A | 1/1982 | Shupert | |
| 5,490,713 A | 2/1996 | Fukuoka | |
| 5,876,085 A | 3/1999 | Hill | |
| 6,042,093 A | 3/2000 | Garelick | |
| 8,091,450 B2 * | 1/2012 | Manzoor ............. | F16F 15/1428 |
| | | | 464/73 |
| 8,146,899 B2 | 4/2012 | Hiser | |
| 9,821,689 B2 | 11/2017 | Busboom et al. | |
| 10,029,738 B2 | 7/2018 | Andre et al. | |
| 2013/0175746 A1 * | 7/2013 | Khatib-Shahidi ....... | F16F 1/025 |
| | | | 267/164 |

FOREIGN PATENT DOCUMENTS

| | | | | | |
|---|---|---|---|---|---|
| DE | 102010041177 A1 * | 3/2012 | .............. | F16F 1/373 |
| FR | 3025273 A1 * | 3/2016 | .......... | B62D 21/152 |
| GB | 2561897 A * | 10/2018 | ................ | F16F 1/38 |
| WO | WO-2016099872 A1 * | 6/2016 | ............ | F16B 5/0241 |

\* cited by examiner

*Primary Examiner* — Melody M Burch
(74) *Attorney, Agent, or Firm* — Wegman Hessler

(57) ABSTRACT

A biasing element provides suspension between a pivoting component and a support area of a riding outdoor power equipment vehicle, and can include a body compressible between a default unbiased orientation and a compressed orientation. The body can include annular portions having a radially outer main portion circumscribing radially inner portions. The radially inner portions being vertically spaced apart when the body is in the default orientation and movable into engagement with one another upon compression of the body.

13 Claims, 10 Drawing Sheets

70

82

90

86     84     80

ISOLATOR AND SUSPENSION ASSEMBLY FOR RIDING EQUIPMENT

CROSS REFERENCE TO RELATED APPLICATIONS

This application is a divisional application of U.S. patent application Ser. No. 16/571,756 filed Sep. 16, 2019, which is incorporated herein by reference in its entirety.

FIELD OF INVENTION

Aspects of the disclosed technology relate generally to riding equipment and more particularly to a suspension assembly for resisting movement of an operator platform of outdoor riding equipment, such as equipment including a mower deck for cutting vegetation, such as a riding mower.

BACKGROUND

Riding equipment, whether for indoor use, outdoor use, or a combination of indoor and outdoor use, can include a sitting platform or a standing platform operating in conjunction with a suspension assembly for supporting an operator or rider. The suspension assembly is provided to cushion the rider by damping forces seen by the riding equipment, lessening the transfer of these forces to the operator. Typical suspension assemblies control or restrict movement between an operator platform (sitting, standing, or a combination thereof) and a chassis of the riding equipment. These typical suspension assemblies often are "one-size-fits-all" assemblies that do not account for varying weights of varying operators. In such cases, the biasing spring rate resisting movement of the operator platform is the same for both a lower weight operator and a heavier weight operator, making the riding experience uncomfortable for at least one of these rider classes.

SUMMARY OF INVENTION

Aspects of the disclosed technology may address one or more of these issues and may additionally or alternatively address other issues in suspension assemblies of riding equipment.

Disclosed is a riding power equipment vehicle, such as a riding outdoor power equipment vehicle for grounds maintenance, having a chassis including a support area, an operator platform for supporting a rider and supported by the chassis, and a suspension assembly. The suspension assembly is configured to resist movement of the operator platform towards the support area of the chassis and includes a biasing element configured to provide suitable deflection with lower weights applied to the operator platform and to reduce the deflection upon greater weight being applied to the operator platform while maintaining adequate isolation of an operator from forces seen by the riding equipment vehicle during use.

The suspension may include one or more biasing elements, each having a plurality of annular portions. At least two annular portions of the plurality of annular portions are spaced apart from one another when the biasing element is in a default orientation and are moved into engagement with one another upon compression of the biasing element between the operator platform and the support area. Compression of the biasing element provides an initial deflection response whose rate decreases substantially in response to increasing loading being applied to the operator platform.

According to one aspect, a riding outdoor power equipment vehicle includes a chassis supporting one or more ground engaging members for allowing movement of the vehicle. The chassis includes a support area, an operator platform supported by the chassis for pivoting movement relative to the support area between an operating position and a disengaged position, and a suspension assembly disposed between the operator platform and the support area when the operator platform is in the operating position. The suspension assembly is configured to be compressed to resist movement of the operator platform towards the support area. The support area supports the operator platform when the suspension assembly is engaged between the operator platform and the support area. The suspension assembly includes at least one biasing element having a body defining at least three annular portions. The at least three annular portions include a radially outer main portion circumscribing a pair of radially inner portions. The pair of radially inner portions are vertically spaced apart from one another when the at least one biasing element is in a default orientation and are movable into engagement with one another upon compression of the biasing element between the operator platform and the support area.

The pair of radially inner portions each may extend along a respective portion axis, which portion axes are aligned parallel to one another.

The portion axes may extend transverse a pivot axis of the operator platform.

The at least three annular portions each may extend along respective portion axes that are each aligned parallel to one another.

The body of the biasing element may extend between opposing first and second faces, and each of the annular portions may have a constant profile extending between the first face and the second face.

The pair of radially inner portions each may share a common annulus sector with the radially outer main portion.

The pair of radially inner portions may include a vertically upper annular portion and a vertically lower annular portion, and the vertically lower annular portion may be configured to have a faster rate of compression than the vertically upper annular portion.

The pair of radially inner portions may include a vertically upper annular portion and a vertically lower annular portion, and the biasing element may be configured such that compression of the radially outer main portion provides a greater compression distance per unit of force applied to the biasing element than is provided by subsequent compression of the vertically lower annular portion.

The compressible element may be configured such that engagement of the biasing element between the operator platform and the support area causes compression of the radially outer main portion prior to compression of either of the pair of radially inner portions.

The biasing element may include a retention member extending from the radially outer main annular portion for engaging in a slot of the support area or of the operator platform to fix position of the biasing element relative to a pivot axis of the operator platform.

The biasing element may comprise a single molded article having unitary construction.

The biasing element may be configured to resist inelastic compression.

The suspension assembly further may include a pair of biasing elements spaced apart from one another and fixed relative to a pivot axis of the operator platform.

According to another aspect, a riding outdoor power equipment vehicle includes a chassis supporting one or more ground engaging members for allowing movement of the vehicle, and the chassis includes a support area. An operator platform is supported by the chassis for pivoting movement relative to the support area between an operating position and a disengaged position. A suspension assembly is disposed between the operator platform and the support area when the operator platform is in the operating position. The suspension assembly is configured to be compressed to resist movement of the operator platform towards the support area. The support area supports the operator platform when the suspension assembly is engaged between the operator platform and the support area. The suspension assembly includes at least one biasing element having a pair of annular portions each defining a respective cavity extending at least partially therethrough. The annular portions are connected to one another via radially outwardly spaced resilient portions forming with the pair of annular portions a radially outer annular portion circumscribing the respective cavities of the pair of annular portions.

The pair of annular portions may be spaced from one another by the radially outwardly spaced resilient portions when the biasing element is in a default unbiased orientation.

The compressible element may have a body defining at least three cavities extending therethrough along respective parallelly-aligned cavity axes.

According to yet another aspect, a biasing element for providing suspension between a pivoting component and a support area of a riding outdoor power equipment vehicle includes a body compressible between a default unbiased orientation and a compressed orientation. The body has at least three annular portions. The at least three annular portions include a radially outer main portion circumscribing a pair of radially inner portions. The pair of radially inner portions are vertically spaced apart from one another when the body is in the default orientation and are movable into engagement with one another upon compression of the body. At least one retaining member is provided for allowing fixing of the body.

The biasing element may comprise a single molded article having unitary construction.

The pair of radially inner portions may include a vertically upper annular portion and a vertically lower annular portion, and the vertically lower annular portion may be configured to have a faster rate of compression than the vertically upper annular portion.

The pair of radially inner portions may include a vertically upper annular portion and a vertically lower annular portion, and the body may be configured such that compression of the radially outer main portion provides a greater compression distance per unit of force applied to the body than is provided by subsequent compression of the vertically lower annular portion.

The foregoing and other features of the disclosed technology are hereinafter described in greater detail with reference to the accompanying drawings.

BRIEF DESCRIPTION OF THE DRAWINGS

The annexed drawings, which are not necessarily to scale, show various aspects of the disclosure.

DETAILED DESCRIPTION

The principles of the present disclosure have general application to riding equipment, whether for sitting, standing or a combination of both, and whether indoor or outdoor riding equipment. More particular application is to outdoor riding equipment such as a sitting mower. Thus, while the present disclosure is majoratively direct to a sitting mower, the suspension assembly disclosed also has utility for inclusion with non-mowing, standing or non-outdoor riding equipment, among other categories.

A riding outdoor power equipment vehicle of the present disclosure incudes a chassis, an operator platform, and a suspension assembly. The suspension assembly is configured to restrict movement of the operator platform relative to the chassis, and in particular, towards a support area of the chassis. Generally, the suspension assembly is not position-adjustable and is fixed relative to the chassis. Although, in other embodiments, the suspension assembly may be selectively moveable relative to the chassis.

The suspension assembly includes one or more biasing elements that are configured to be disposed between the operator platform and the support area of the chassis to resist movement of the operator platform towards the support area. The biasing element is constructed to function with varying loadings applied to the operator platform. With the varying loadings, reduced deflection rate of the operator platform is enabled at higher loadings via the unique construction of the biasing element, allowing for a more uniform riding experience for operators of varied weights.

Figure 1:
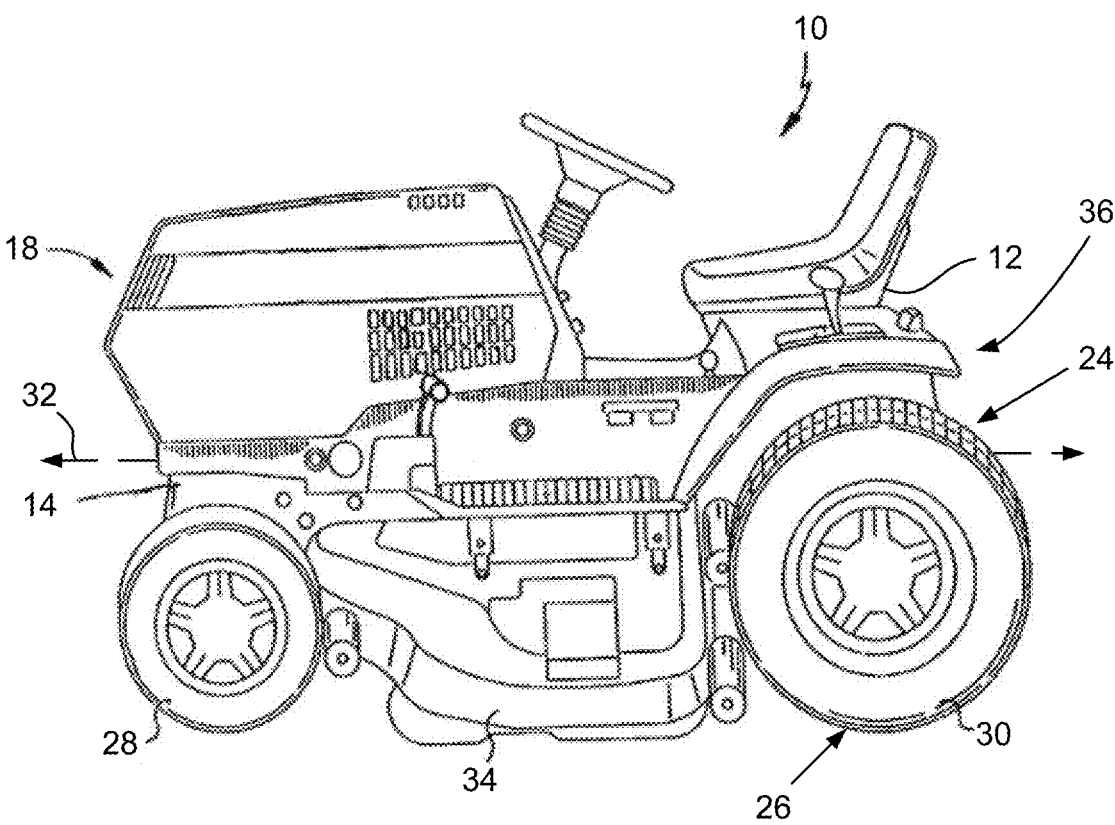
FIG. 1 is an environmental view of a riding mower including an operator platform and associated suspension assembly according to the present disclosure.

Turning now to FIG. 1, a riding outdoor power equipment vehicle 10, such as a riding mower is depicted including an operator platform 12 for supporting an operator of the vehicle 10. The operator platform 12 is supported by a chassis 14 that also supports an external body 18 of the vehicle 10. A drive system 24 is further supported by the chassis 14 for moving the vehicle 10 about a work area. The drive system 24 includes one or more surface engaging movable members 26.

The movable member 26 are shown as two pairs of wheels, including a pair of front wheels 28 longitudinally spaced from a pair of rear wheels 30 along a central longitudinal axis 32 of the vehicle 10. In other embodiments, other members may be utilized, such as treads, skis, etc. and fewer than four total members may be included.

The vehicle 10 includes a ground maintenance element 34, which in the depicted vehicle is illustrated as a mowing deck. In other embodiments, the deck may be omitted or an alternative element 34 may be include.

Figure 2:
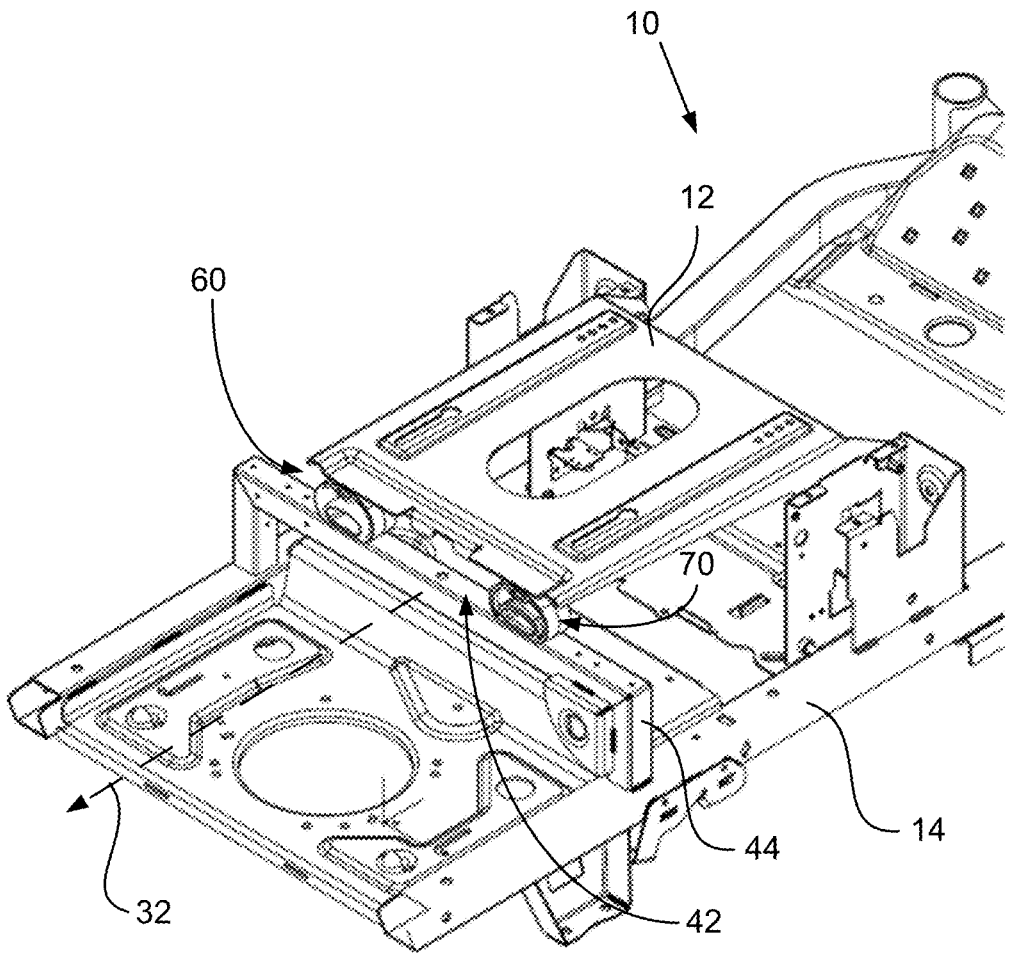
FIG. 2 is a partial view of the riding vehicle of FIG. 1, with portions of the body removed to allow for visibility of the chassis.
Figure 3:
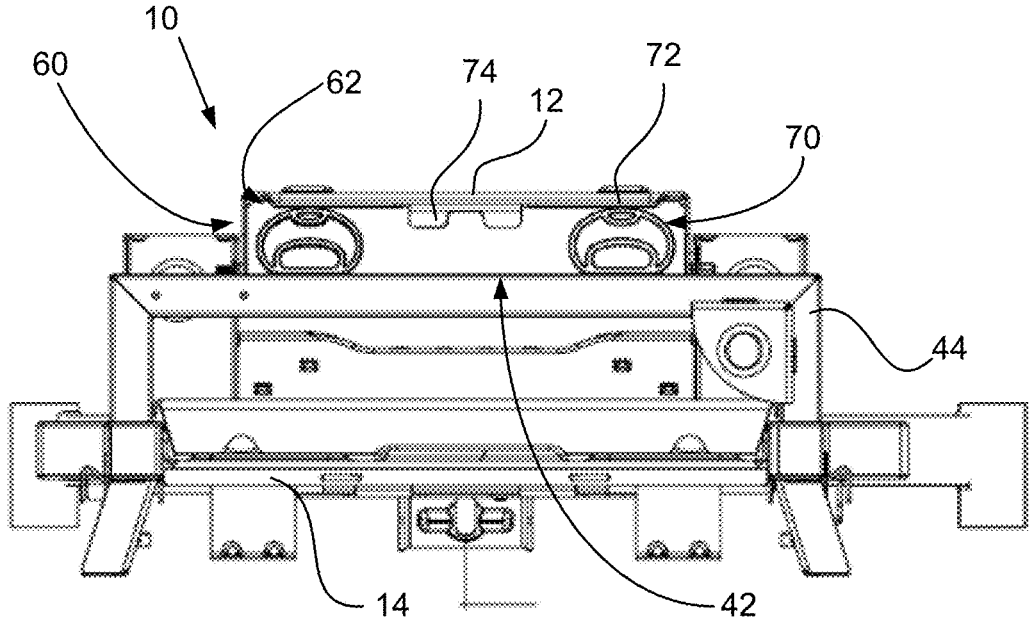
FIG. 3 is a partial rear view of the riding mower of FIG. 1.
Figure 4:
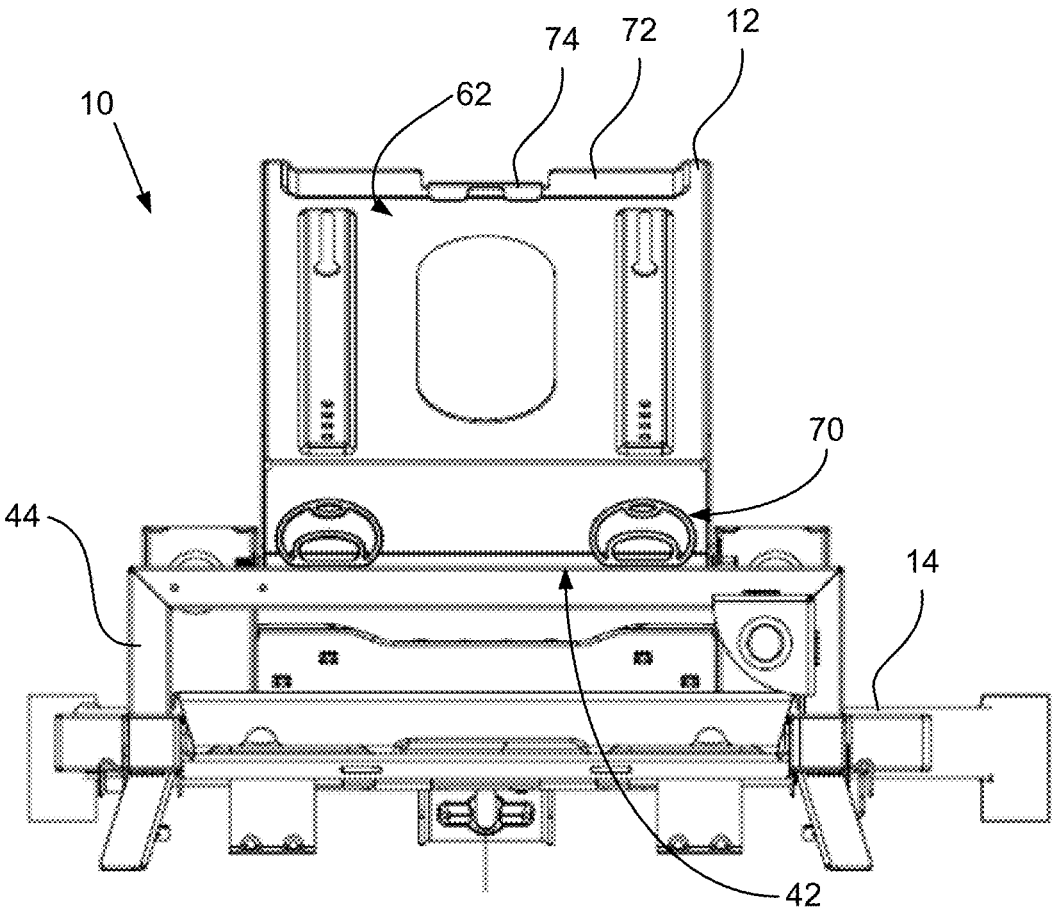
FIG. 4 is yet another partial rear view of the riding mower of FIG. 1.
Figure 5:
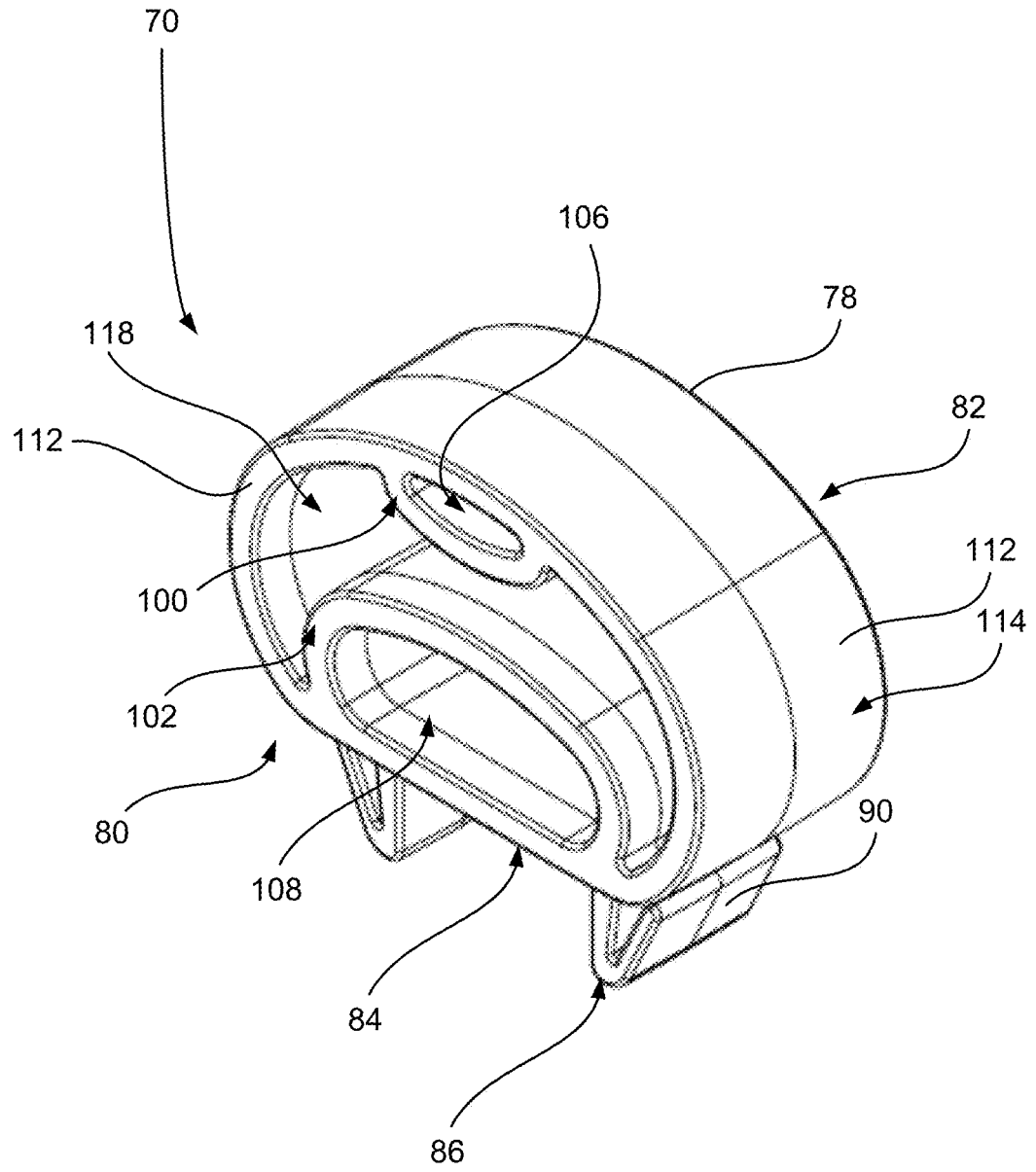
FIG. 5 is an orthogonal view of a biasing element of the suspension assembly of the riding mower of FIG. 1 depicted apart from the riding vehicle.

The operator platform 12 is disposed at a rear 36 of the vehicle 10, along the central longitudinal axis 32. A seat 38 is coupled to the operator platform 12 for allowing comfortable riding by the operator. Turning to FIGS. 2 to 4, the operator platform 12 is supported by the chassis 14 for pivoting movement relative to the chassis. In particular, the operator platform 12 is coupled to the chassis 14 via pivoting members (not specifically shown) such as hinges. Pivoting of the operator platform 12 is conducted about a platform pivot axis 40, which axis is fixed relative to the chassis 14. The operator platform 12 is allowed to pivot between an operating position for supporting the operator, shown in FIG. 3, and a disengaged position, spaced, such as upwardly spaced, from the operating position, as shown in FIG. 4.

As shown in FIGS. 2 to 4, the chassis 14 includes a support area 42. The support area 42 is depicted as a portion of an elevated crossmember 44 of the chassis 14, but the support area 42 may be otherwise shaped relative to a remainder of the chassis 14 in other embodiments. The support area 42 is disposed such that it is situated colongitudinally along the longitudinal axis 32 with at least a portion of the operator platform 12, and as depicted, with a rear portion of the operator platform 12.

The vehicle 10 further includes a suspension assembly 60 for supporting the operator platform 12 and the weight of an operator loaded at the operator platform 12. The suspension assembly 60 is generally disposed between the operator platform 12 and the support area 42 when the operator platform 12 is in the operating position. The depicted embodiment includes the suspension assembly 60 coupled to the chassis 14 at the support area 42. In this way, the support area 42 supports the operator platform 12 when the suspension assembly 60 is engaged between the operator platform 12 and the support area 42. In other embodiments, the suspension assembly 60 instead may be coupled to the operator platform 12, such as to an underside 62 of the operator platform 12.

The suspension assembly 60 is configured to be compressed to resist movement of the operator platform 12 towards the support area 42 during compression of the suspension assembly 60, such as between the operator platform 12 and the support area 42. Generally, the suspension assembly allows for isolation of the operator from at least a portion of forces seen by the vehicle 10 during its use. For example, a vehicle traversing uneven ground can be imparted with jostling forces greater than accounted for by suspension elements coupled to the moveable members 26, or typical vibrations from the moving vehicle 10 can be transferred towards the operator. To provide a reduction in jostling or vibration for the operator, the suspension assembly 60 can reduce impact to the operator via a biasing spring force of the suspension assembly 60 (including the possibility of dampening from the polymer incorporated into the suspension assembly 60).

The depicted suspension assembly 60 includes a pair of biasing elements 70 laterally spaced apart from one another across the longitudinal axis 32. The biasing elements 70 are coupled to the chassis 14, and particularly to the support area 42 for fixing the location of the biasing element 70 relative to the pivot axis 40. In some other embodiments, any suitable number of biasing elements 70 may be included, such as being adequately spaced apart to prevent contact with one another during compression.

The operator platform 12 includes a contacting portion 72 that is configured, such as being shaped to engage the biasing elements 70 coupled to the support area 42. The contacting portion 72 is arranged to simultaneously contact each of the biasing elements 70.

A limiting portion 74 extends from the underside 62 of the operator platform 12, providing a hard stop for downward movement of the operator platform 12 towards the support area 42. The limiting portion 74 is arranged to contact a portion of the support area 42, such as laterally intermediate between the biasing elements 70. Each of the limiting portion 74 and the contacting portion 72 may be alternative shapes in other embodiments.

Turning now to FIGS. 5 to 9, a biasing element 70 is depicted apart from the support area 42. It will be appreciated that the biasing elements 70 depicted in FIGS. 2 to 4 are each identical, but may be otherwise constructed in alternative embodiments.

The biasing element 70 includes a body 78 that is generally configured to resist inelastic compression, such that the biasing element 70 provides for repeatable and repeated use. The depicted body 78 is a single article, such as a molded article, having unitary construction. Accordingly, the biasing element 70 is formed as a single unit absent secondary attachments or selectively removable portions. The body 78 may be formed via any suitable molding process, such as injection molding, extrusion molding, etc.

Suitable materials from which the biasing element 70 can be made include polymers that have minimal to no loss of deflection values at high or low temperatures, allowing for continued biasing of the operator platform 12 when the riding vehicle 10 is used in both temperature extremes. In one embodiment Arnitel, such as Arnitel PL581 may be used. In other embodiments a Keyflex BT material or thermoplastic copolyester elastomer may be used.

The biasing element body 78 extends along a longitudinal extent between front and rear faces 80 and 82. The body 78 is generally ovular in shape and includes a generally flat bottom 84 for allowing stable engagement with the support area 42. One or more retaining portions 86 extend from the bottom 84 to allow for coupling with the support area 42, and fixing of the biasing element 70 relative to the pivot axis 36 of the operator platform 12.

The body 78 has a lateral width in a range between about 3 inches and about 6 inches, such as a range of about 4 inches to about 6 inches, such as about 5 inches. An overall height of the body 78 absent the retaining portions 86 may be in the range of about 2 inches to about 4 inches, or about 2.5 inches to about 3.5 inches, or about 3 inches. Accordingly, the body 78 absent the retaining portions 86 has a greater width than vertical height.

In the depicted embodiment, a pair of the retaining portions 86, also herein referred to as retention members, extend from the bottom 84 and are laterally spaced from one another along the bottom 84. Each of the retaining portions 86 includes a biasing sub-portion 90 that is compressible to allow for insertion into a slot of the support area 42, but that returns to a default position after insertion to prevent removal of the biasing element 70 relative to the support area 42. For example, the crossmember 44 having the support area 42 may include an inner cavity (not shown) into which the biasing sub-portion 90 is inserted, where the biasing sub-portion 90 may expand from a compressed orientation (allowing the retaining portion 86 to enter the slot) to a default orientation. In some embodiments, any suitable number of biasing sub-portions 90 may be included.

The body 78 defines at least a pair of annular portions 100 and 102 that are vertically spaced part from one another along a central vertical axis 104 of the biasing element 70 when the body 78 is in a default orientation. Each of the annular portions 100 and 102 extends completely between the front face 80 and the rear face 82 of the body 78, and each defines a respective cavity 106 and 108 also extending between the front and rear faces 80 and 82. In the depicted embodiment, each of the cavities 106 and 108 has a constant shape extending along the longitudinal extent 79. Likewise, each of the annular portions 100 and 102 has a constant profile extending along the longitudinal extent 79.

In other embodiments, one or more of the cavities 106 and 108 may extend only partially along the longitudinal extent 79. Additionally or alternatively, one or more of the cavities 106 and 108 may have a non-constant shape extending along the longitudinal extent 79, and/or one of the annular portions 100 and 102 may have a non-constant profile extending along the longitudinal extent 79.

The annular portions 100 and 102 are connected to one another via a pair of opposing radially outwardly spaced resilient portions 112. These portions 112 form with the pair of annular portions 100 and 102 a radially outer annular portion 114 that circumscribes each of the cavities 106 and 108 and the pair of annular portions 100 and 102. Thus, the annular portions 100 and 102 may be referred to as radially inner annular portions.

Figure 6:
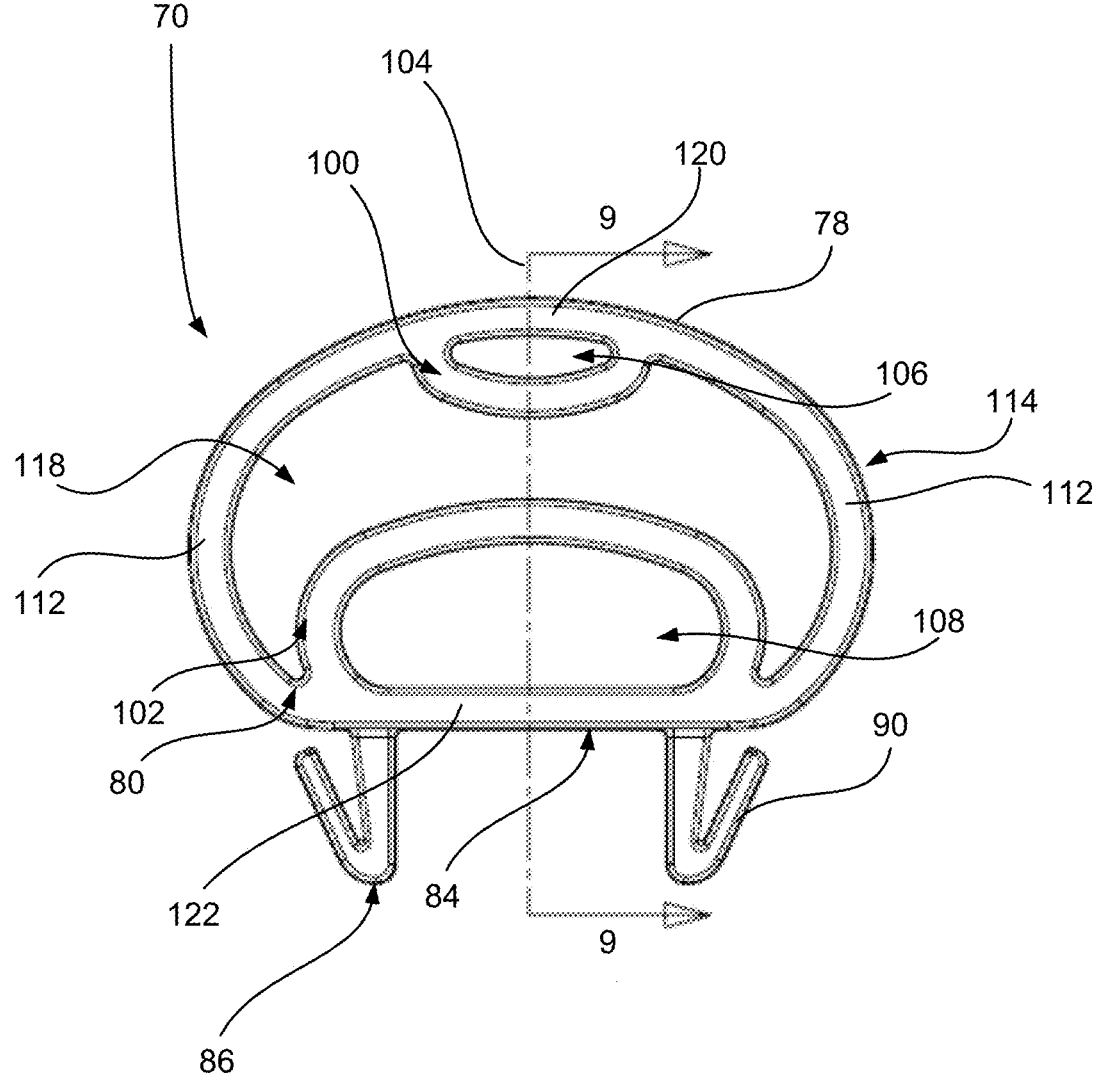
FIG. 6 is a front view of the biasing element of FIG. 5.
Figure 7:
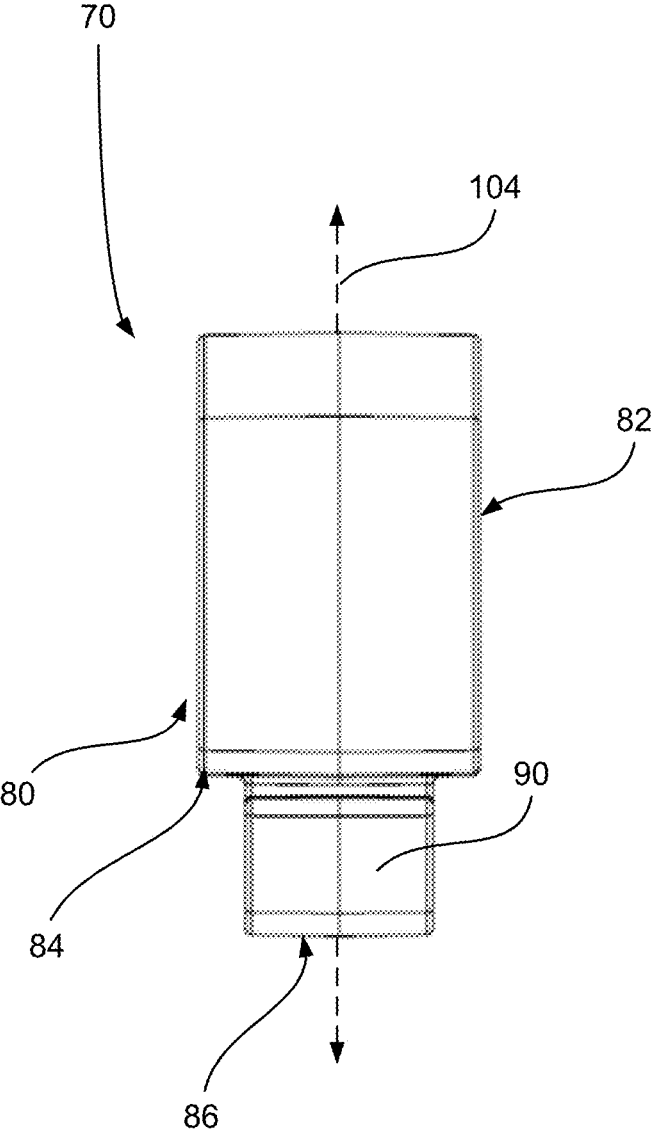
FIG. 7 is a side view of the biasing element of FIG. 5.
Figure 8:
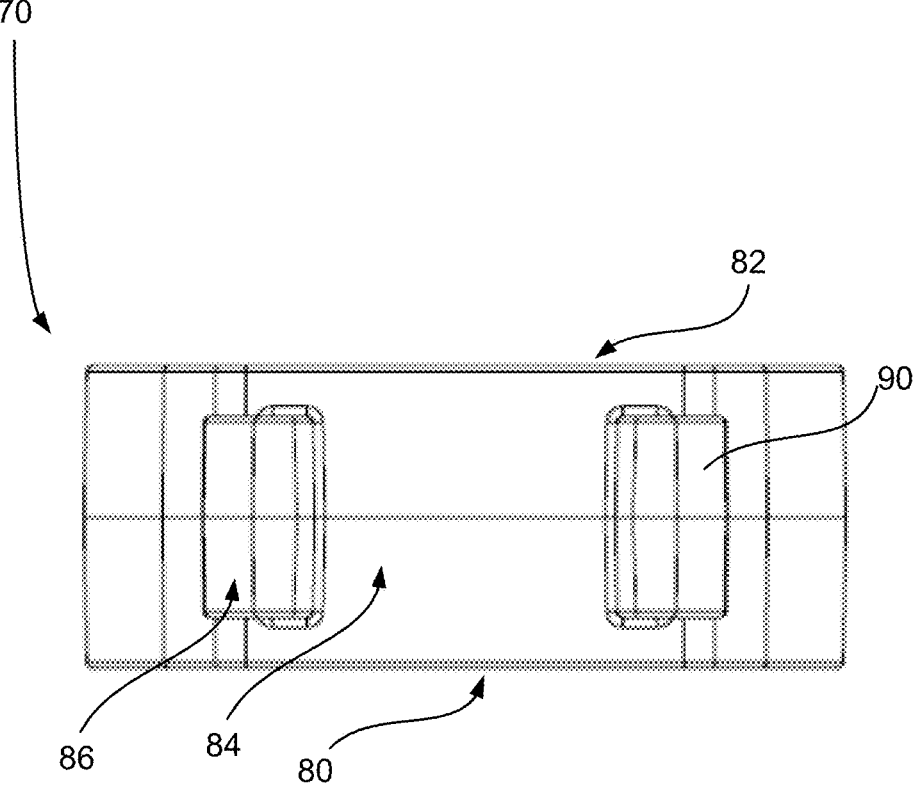
FIG. 8 is a bottom view of the biasing element of FIG. 5.

Turning specifically to FIG. 6, each of the inner annular portions 100 and 102 shares with the radially outer portion 114 a common annulus sector. The inner annular portion 100 shares the vertically upper common annulus sector 120 with the radially outer portion 114, and the inner annular portion 102 shares the vertically lower common annulus sector 122 with the radially outer portion 114.

The body 78 forming each of the inner and outer annular portions 100, 102 and 114 has sectors of similar thickness in the illustrated embodiment. In other embodiments, one or more annular portions may have one or more sectors of different thickness.

A central cavity 118 is defined by the body 78 and extends centrally along the longitudinal extent. The central cavity 118 is formed in part by each of the inner and outer annular portions 100, 102 and 114.

Figure 9:
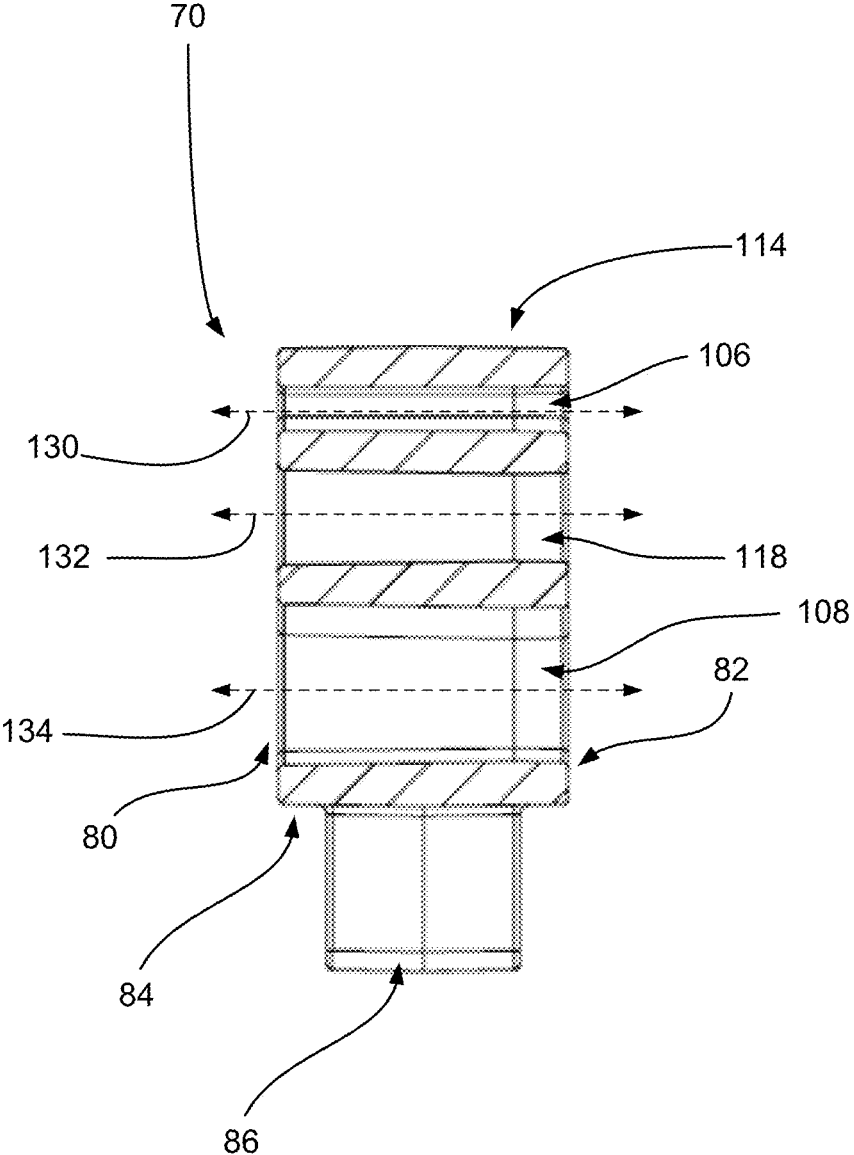
FIG. 9 is a cross-sectional view of the biasing element of FIG. 5, taken along the line Y-Y of FIG. 6.

Turning specifically to FIG. 9, each of the three cavities 106, 108 and 118 (and likewise the three annular portions 100, 102 and 114) extend along respective parallelly-aligned cavity axes 130, 132 and 134. The axes 130, 132 and 134 are aligned transverse the pivot axis 36 of the operator platform 12, such as being orthogonal to the pivot axis 36. In other embodiments one or more of the axes 130, 132 and 134 may extend non-parallelly to the other of the axes 130, 132 and 134.

During compression of the biasing element 70 from its default unbiased orientation to an initial compressed orientation, engagement of the biasing element 70 between the operator platform 12 and the support area 42 causes compression of the radially outer main portion 114 prior to compression of either of the pair of radially inner portions 100 and 102. For lower weight operators, initial compression of the radially outer main portion 114 may not bring the pair of radially inner portions 100 and 102 into engagement with one another. Accordingly, the biasing element 70 is configured such that the annular portions compress in succession.

Via construction of the body 78, compression of the radially outer main portion 114 provides a greater compression distance per unit of force applied to the biasing element 70 than is provided by subsequent compression of the vertically lower annular portion 102. Thus, the operator platform 12 may have greater deflection rate towards the support area 42 for lower and intermediate loads (weighted operators).

Subsequent to initial compression of the radially outer main portion 114, the inner portions 100 and 102 can be vertically brought into engagement with one another. The vertically lower annular portion 102 is configured to have a faster rate of compression than the vertically upper annular portion 100. And thus when brought into engagement with one another, the vertically upper annular portion 100 will engage and cause compression of the vertically lower portion 102, such as in relation to a heavier loading at the operator platform. It will be appreciated that at this point the outer main portion 114 and the inner portions 100 and 102 are all compressing at different rates.

Figure 10:
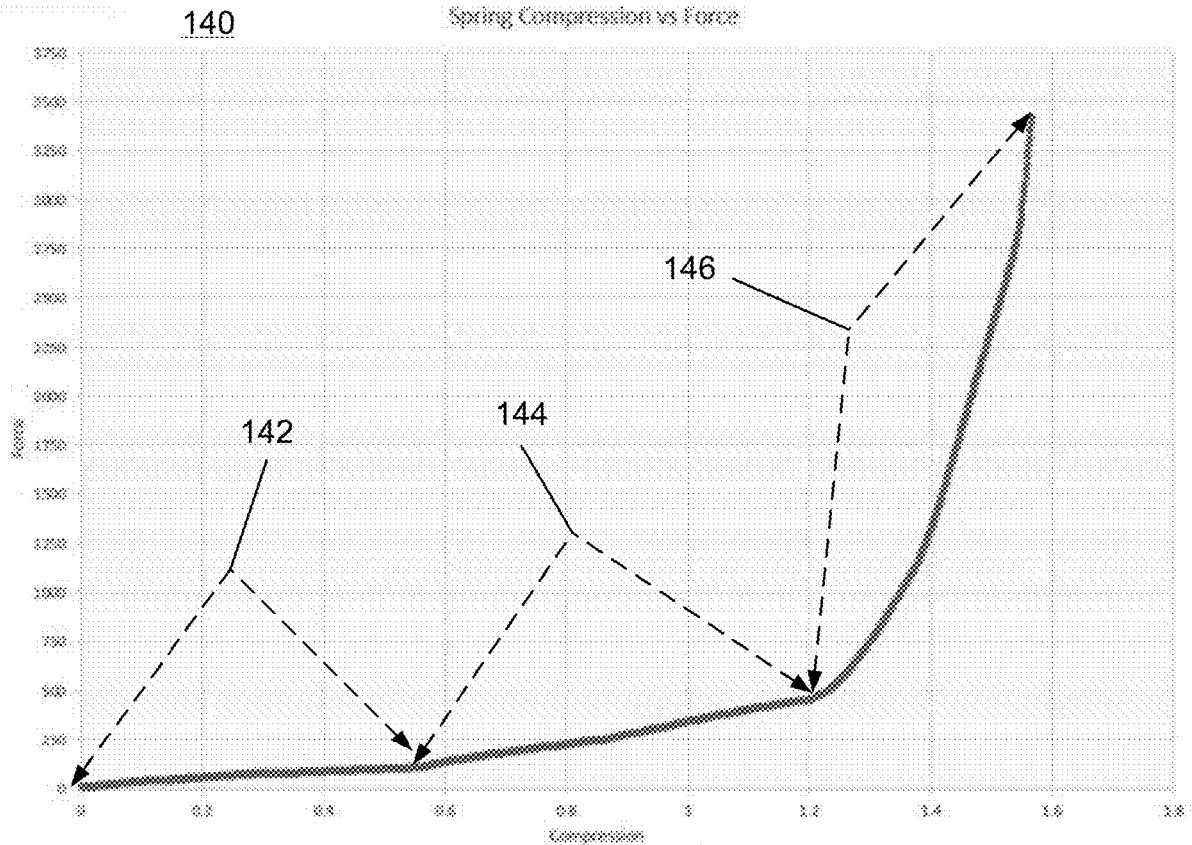
FIG. 10 is an exemplary spring compression vs. force graph detailing compression of the biasing element depicted at FIG. 5.

Turning now to FIG. 10, a force vs. compression graph 140 of the loading of the biasing element 70 is provided, further detailing the succession of compression of the plurality of annular portions 100, 102 and 114. It will be appreciated that this can also be thought of as loading versus compression. While FIG. 10 includes exemplary values, it will be appreciated that aspects of the disclosed technology are not limited to the exemplary values shown in FIG. 10. The exemplary graph 140 includes three interconnected sections 142, 144 and 146. The graph begins at 0 deflection and 0 loading, referring to the default orientation of the biasing element 70. The first section 142 corresponds with compression of the radially outer annular portion 114. In accordance with on example, the first section 142 represents a gradual increase in deflection caused by an operator load of about 0 lbs to about 125 lbs. At about 125 lbs deflection (vertically downward) of the biasing element 70 along the vertical axis 104 is about 0.55 inches.

At the second section 144, the vertically upper annular portion 100 engaged the vertically lower annular portion 102. This engagement compresses the vertically lower annular portion 102, while the radially outer annular portion continues to compress. At approximately 125 lbs of loading, the vertically lower and upper annular portions 102 and 100 engage. The second section 144 represents another gradual deflection, ending at approximately 450 lbs of loading and about 1.2 inches of deflection along the vertical axis 104. This represents the typical maximum loading via an operator.

At the max loading of the second section 144, a vertically upper sector of the vertically lower annular portion 102 has been vertically lowered an intermediate amount. At the third section 146, the initial deflection response has decreased substantially in response to increased loading being applied to the operator platform 12. Continued deflection of the vertically upper annular portion 100 into the space previously occupied by the lower cavity 108 continues until maximum deflection, wherein the upper sector engages the lower sector of the vertically lower annular portion 102.

In summary, a riding outdoor power equipment vehicle 10, such as for grounds maintenance, has a chassis 14 including a support area 42, an operator platform 12 for supporting a rider and supported by the chassis 14, and a suspension assembly 60. The suspension assembly 60 is configured to resist movement of the operator platform 12 towards the support area 42 of the chassis 14 and includes a biasing element 70 having a plurality of annular portions 100, 102 and 114. At least two annular portions 100 and 102 of the plurality of annular portions 100, 102 and 114 are spaced apart from one another when the biasing element 70 is in a default orientation and are moved into engagement with one another upon compression of the biasing element

70 between the operator platform 12 and the support area 42. Compression of the biasing element 70 provides an initial deflection response that decreases substantially in response to increasing loading being applied to the operator platform 12.

Although the disclosed technology has been shown and described with respect to a certain preferred aspect, embodiment or embodiments, it is obvious that equivalent alterations and modifications will occur to others skilled in the art upon the reading and understanding of this specification and the annexed drawings. In particular regard to the various functions performed by the above described elements (components, assemblies, devices, members, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary aspect, embodiment or embodiments of the disclosed technology. In addition, while a particular feature of the disclosed technology may have been described above with respect to only one or more of several illustrated aspects or embodiments, such feature may be combined with one or more other features of the other embodiments, as may be desired and advantageous for any given or particular application.

The invention claimed is:

1. A biasing element for providing suspension between a pivoting component and a support area of a riding outdoor power equipment vehicle, the biasing element comprising:

a body compressible between a default unbiased orientation and a compressed orientation;

the body having at least three annular portions, the at least three annular portions including a radially outer main portion circumscribing a pair of radially inner portions, the pair of radially inner portions being movable during operational engagement between the default unbiased orientation in which the radially inner portions are vertically spaced apart from one another, and have a gap extending fully between one another, and the compressed orientation in which the radially inner portions are engaged with one another;

at least one retaining member projecting outwardly from the outer main portion for allowing fixing of the body; and wherein the resulting biasing element may undergo compression of at least 1.2 inches and produces a force in response to said compression, produces a force to compression rate that increases with increasing compression, and wherein the force to compression rate increases from at least 227 lb/in to at least 500 lb/in as the biasing element undergoes compression from 0 to 1.2 inches.

2. The biasing element of claim 1, wherein the pair of radially inner portions include a vertically upper annular portion and a vertically lower annular portion, and wherein the vertically lower annular portion is configured to have a faster rate of compression than the vertically upper annular portion.

3. The biasing element of claim 1, wherein the pair of radially inner portions include a vertically upper annular portion and a vertically lower annular portion, and wherein the body is configured such that compression of the radially outer main portion provides a greater compression distance per unit of force applied to the body than is provided by subsequent compression of the vertically lower annular portion.

4. The biasing element of claim 1, wherein the pair of radially inner portions each extend along a respective portion axis, which portion axes are aligned parallel to one another.

5. The biasing element of claim 4, wherein the portion axes extend transverse a pivot axis of the operator platform.

6. The biasing element of 1, wherein the at least three annular portions each extend along respective portion axes that are each aligned parallel to one another.

7. The biasing element of claim 1, wherein the body of the biasing element extends between opposing first and second faces, and wherein each of the annular portions has a constant profile extending between the first face and the second face.

8. The biasing element of claim 1, wherein the pair of radially inner portions each share a common annulus sector with the radially outer main portion.

9. The biasing element of claim 1, wherein the radially outer main portion compressible element is configured such that engagement of the biasing element between the operator platform and the support area causes compression of the radially outer main portion prior to compression of either of the pair of radially inner portions.

10. The biasing element of claim 1, wherein the biasing element compressible element has a body defining at least three cavities extending therethrough along respective parallelly-aligned cavity axes.

11. The biasing element of claim 1, wherein the radially outer main portion defines a closed oval.

12. The biasing element of claim 1, wherein each of the pair of radially inner portions is defined by a continuous smooth curve forming a closed oval.

13. The biasing element of claim 1, wherein the pair of radially inner portions each extend along an extent; and wherein at least one of the radially inner portions has a non constant shape along the extent.

* * * * *